Aug. 29, 1967    V. E. HAGLUND    3,338,318
ICE DRILL
Filed Oct. 22, 1965

INVENTOR
VICTOR E. HAGLUND
BY
ATTORNEY

3,338,318
ICE DRILL
Victor E. Haglund, 971 5th St., Dassel, Minn. 55325
Filed Oct. 22, 1965, Ser. No. 501,500
6 Claims. (Cl. 175—18)

This invention relates to an improvement in ice drill and deals particularly with a device capable of drilling a hole through the ice for ice fishing purposes and the like.

The sport of ice fishing has become extremely popular in the colder portions of the country. Considerable money is spent on elaborate heated fish houses and the like which are placed on the ice as soon as it becomes firm enough to support the weight, and other ice fishing equipment. Perhaps the biggest difficulty experienced with ice fishing lies in the time and effort required to cut a hole through the ice. In recent years the use of power driven auger-like drills for forming the holes has increased. However, devices of this type are not only cumbersome and somewhat awkward to handle, but are also expensive to purchase. It is a purpose of the present invention to provide an ice drill which uses a readily available source of power to operate. As a result, the cost of the device is greatly reduced, and the apparatus is very simple to operate.

A considerable proportion of persons ice fishing use their automobiles as a source of transportation to and from the ice houses, and many use their cars to supply a source of heat. The present device also uses a drive unit of the vehicle as the source of power used to drill through the ice. The present drill includes a frame designed to rest upon the surface of the ice and to support a drive wheel or disk on a vertical axis. A multi-sided shaft extends through the axis of this disk and is driven thereby. A drilling blade is mounted upon the lower end of the shaft. The upper end of the shaft supports a knob or handle member which may be held stationary in one hand as the shaft rotates. A portion of the drive wheel or disc projects beyond a side of the frame. By jacking up one or both of the drive wheels of the vehicle and placing the car in gear, the drive wheel will rotate at a desired rate of speed. The frame is slid along the ice until the drive disc of the drill comes in contact to the surface of the tire casing. Thus, the power unit of the vehicle drives the vertical shaft and the drill element of the drill forms the hole through the ice.

A feature of the present invention resides in the provision of an ice drill of the type described in which fan blades are mounted on the underside of the drive disc which rotates the vertical shaft. These fan blades serve to direct the chipped ice from the drilled opening outwardly from beneath the supporting frame.

A further feature of the present invention resides in the fact that in the preferred form of construction, the drill element includes a disc secured on the lower end of the shaft to be normal to the axis thereof and which is provided with generally radially extending slots and on the undersurface the slots are inclined so that rotation of the blade causes the ice cut off by the drill to pass through the slots in the disc.

A further feature of the present invention resides in the ease with which the ice chipped or shaven off by the cutter blades can be removed from the hole. When it is desired to remove the accumulation of ice and snow from above the slotted disk of the cutter, it is only necessary to pull the shaft upwardly to raise the cutter toward the surface of the ice. The cutter is designed to fit within the fan blades of the driving disk in fully elevated position. Accordingly, as the drill is raised, the chipped and shaven ice is merely forced from beneath the frame by the rotation of the fan blades.

A further feature of the present invention resides in the fact that the hole through the ice may be redrilled at whatever intervals are necessary to keep the hole free of ice. If desired, the vehicle may remain in the same position during the ice fishing operation, and it is only necessary to replace the drill in its previous position and to place the vehicle in gear to redrill the hole.

These and other objects and novel features of the present invention will be more clearly and fully set forth in the following specification and claims.

In the drawings forming a part of the specification:

Figure 1:
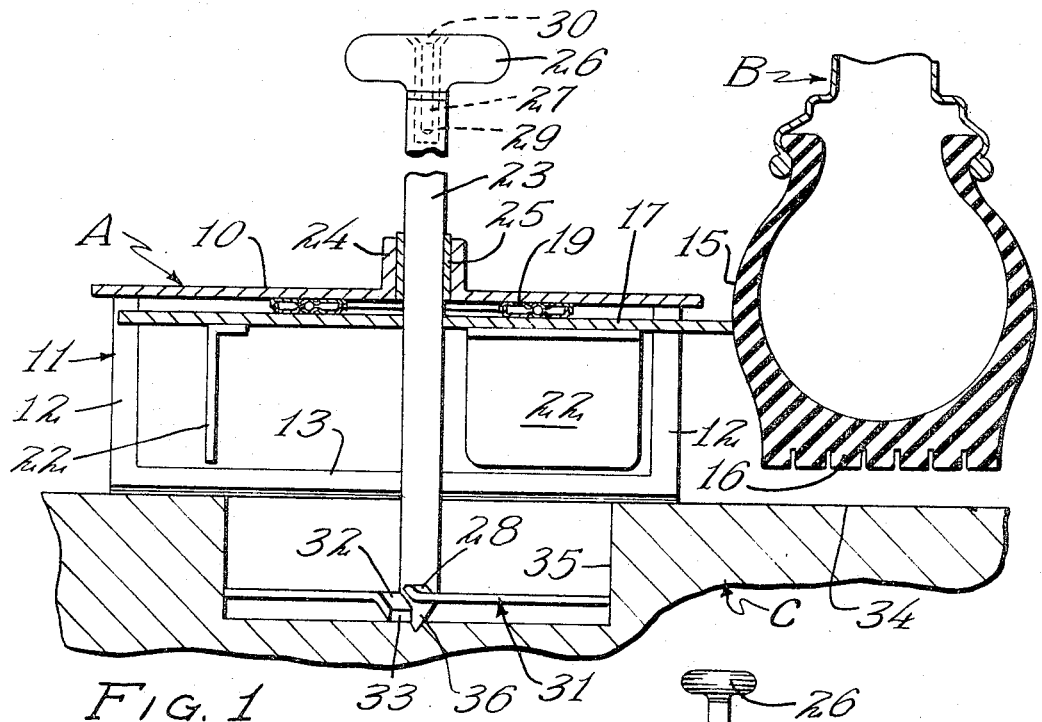
FIGURE 1 is a diagrammatic vertical sectional view through the drill, the ice, and the vehicle wheel showing the arrangement of parts during the drilling operation.

The ice drill is indicated in general by the letter A. The drill includes a supporting frame including a flat table-like top 10 which is supported by a pair of generally U-shaped supports indicated in general by the numeral 11. Each of the U-shaped supports 11 include a pair of vertical legs 12 and a horizontal runner 13 connecting the lower ends of two of the legs.

Figure 2:
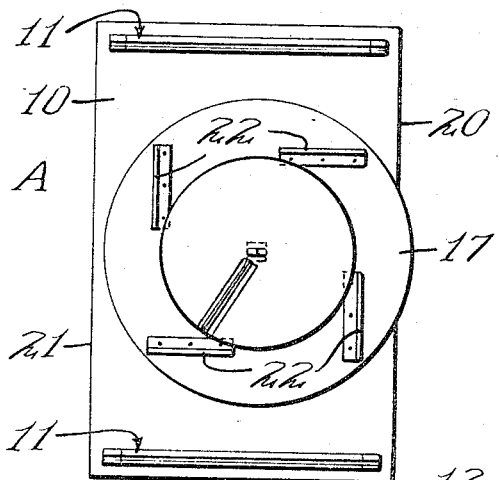
FIGURE 2 is a bottom plan view of the ice drill including the supporting frame and drive disk.
Figure 3:
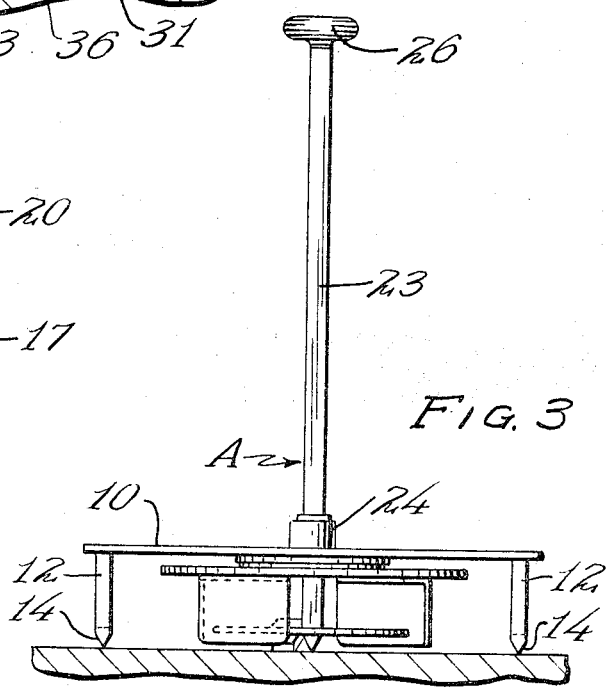
FIGURE 3 is a side elevational view of the drill.

As is indicated in FIGURE 2 of the drawings, the frame top 10 is elongated and generally rectangular in form, and the legs 12 extend downwardly from the top 10 near the corners of the top. The runners 13 extend transversely of the longitudinal axis of the frame, and the lower edges of the runners 13 are preferably V-shaped in cross-section as indicated in FIGURE 3. The shape of the runners simplifies the movement of the frame toward and away from the wall 15 of the tire casing mounted on the rim of the vehicle wheel, the vehicle being indicated in general by the letter B.

A drive disk 17 is rotatably supported on the undersurface of the frame top 10, the disk being supported by a ball-bearing unit 19 securing the disk to the undersurface of the frame top 10. The axis of the ball-bearing 19 is preferably arranged so that a portion of the periphery of the disk projects beyond one longitudinal edge 20 of the frame top 10 but lies inwardly of the opposite longitudinal edge 21 thereof. A series of fan blades 22 are supported in angularly spaced relation on the undersurface of the disk 17, the blades 22 extending to the periphery of the disk 17, the planes of the blades 22 being tangent to a hypothetical circle coaxial with the disk 17. In other words, the blades 22 are arranged so that rotation of the disk 17 will force the chipped and shaved ice outwardly from beneath the frame of the drill.

A vertical shaft 23 is designed to rotate in unison with the drive disk 17 and extends upwardly through a bearing sleeve 24 extending upwardly from the frame top 10. The shaft 23, in the arrangement illustrated, is formed of rectangular tubing so as to be light in weight, and so as to be axially slidable relative to the disk 17. The shaft 23 may rotate freely within the boss 24, or may be supported extending through a sleeve 25 having a cylindrical outer surface and a rectangular axial aperture therethrough, the sleeve preferably being secured to the disk 17 or to the under portion of the ball-bearing 19. In any event, the shaft 23 is vertically slidable with respect to the disk 17 and is rotated thereby.

A knob 26 is rotatably supported on an axial pivot 27 extending into a plug 29 in the upper end of the shaft 23. The pivot 29 is provided with a head 30 which holds the knob 26 from axial movement relative to the shaft 23, but which permits the shaft to rotate relative to the knob. The knob forms the means of controlling the drill, as well as raising and lowering the drill.

The drill element itself is indicated at 31, and preferably comprises a circular disc secured near the lower end of the shaft 23 and on a plane normal to the axis of the shaft. The disc 31 is provided with a radially extending slot 32 extending therethrough. A cutting blade 33 angles downwardly from an edge of the slot 32 and serves not only as a means of chipping and shaving the surface of the ice, but also of guiding the chipped ice to the upper surface of the disc 31. As a result, the major portion of the ice removed during the operation of the cutting blade is always above the disc. As will be obvious, the disc 31 may be provided with a series of angularly spaced slots 32 and blades 33 in place of the single one indicated. The portion 28 of the disc 31 forwardly of the slot 32 in the direction of rotation is bent upwardly to eliminate clogging of the slot and to direct the chipped ice upwardly.

In the operation of the apparatus, a portion of the rear of the vehicle is jacked up to raise the tire casing 16 above the surface 34 of the ice C. With normal forms of differentials, it is only necessary to jack up one of the rear wheels as long as means is provided for holding the car from movement, as the elevated wheel will normally rotate when the transmission is in gear. On certain types of cars which have a positive means of driving both of the rear wheels, it is necessary to raise both of the wheels.

To operate the drill, with the frame in a position illustrated in FIGURE 3, the edge 20 of the frame is moved toward the wall 15 of the tire casing 16 until the disc 17 frictionally engages the tire wall. The frame is held in this position with one foot or by other suitable means during the drilling operation. When pressure is applied to the knob 26, the cutting blade starts cutting the hole in the ice C. When it is desired to clear the ice from the hole, such as the hole 35 illustrated in FIGURE 1, it is only necessary to raise the shaft 23, and the ice is elevated to a position where it may be forced outwardly by the vanes 22.

The lower end of the shaft 23 is provided with a pointed projection 36 which assists in holding the shaft 23 on a single axis.

In accordance with the patent statues, I have described the principles of construction and operation of my improvement in ice drill, and while I have endeavored to set forth the best embodiment thereof, I desire to have it understood that changes may be made within the scope of the following claims without departing from the spirit of my invention.

I claim:
1. An ice drill adapted for use in combination with a rotating wheel on a stationary vehicle, the drill including:
 a substantially horizontal frame including downwardly extending spaced leg means adapted to rest upon the ice,
 a substantially vertical shaft slidably and rotatably supported extending through said horizontal frame,
 a drive disc rotatably supported beneath said horizontal frame,
 said shaft being rotatable with said disc,
 said disc projecting beyond an edge of said horizontal frame and adapted for engagement with a surface of said rotating wheel, and
 a drilling head secured to the lower end of said shaft.

2. The structure of claim 1 and including a handle secured to the upper end of said shaft by means of which said shaft may be raised or lowered during rotation of said shaft.

3. The structure of claim 1 and including a series of fan blades secured to the under surface of said drive disc and operable to urge chipped ice outwardly from said shaft.

4. The structure of claim 3 and in which said drilling head extends between said fan blades in raised position thereof.

5. The structure of claim 1 and in which said drill head includes a cutter disc secured to said shaft on a plane normal to the axis of said shaft and said cutter disc includes a generally radially extending slot, and a downwardly inclined cutting blade along an edge of said slot and sloping beneath said slot to guide ice upwardly through said slot upon rotation of said shaft.

6. The structure of claim 5 and in which said disc includes a series of downwardly extending fan blades thereon positioned to encircle said cutter disc in raised position of said shaft and to direct loose ice outwardly of said drive disc.

References Cited
UNITED STATES PATENTS

| | | | |
|---|---|---|---|
| 2,692,757 | 10/1954 | Folstad | 175—18 |
| 2,709,572 | 5/1955 | Ageborn | 175—18 |
| 2,982,364 | 5/1961 | Vincent | 175—18 |
| 2,997,118 | 8/1961 | Gulick | 175—18 |
| 3,093,199 | 6/1963 | Premo | 175—18 |
| 3,176,784 | 4/1965 | Nezzle | 175—18 |

CHARLES E. O'CONNELL, *Primary Examiner.*

DAVID H. BROWN, *Examiner.*